United States Patent
Limaye et al.

(10) Patent No.: US 8,942,972 B1
(45) Date of Patent: Jan. 27, 2015

(54) SYSTEMS AND METHODS FOR DATA LOSS PREVENTION IN BILINGUAL TEXT MESSAGES WITH A DATA LOSS POLICY WHICH RECOGNIZES ONLY ONE PRIMARY LANGUAGE

(75) Inventors: Abhijit Limaye, Pune (IN); Anand Bodke, Pune (IN)

(73) Assignee: Symantec Corporation, Mountain View, CA (US)

( * ) Notice: Subject to any disclaimer, the term of this patent is extended or adjusted under 35 U.S.C. 154(b) by 375 days.

(21) Appl. No.: 13/363,958

(22) Filed: Feb. 1, 2012

(51) Int. Cl.
G06F 17/28 (2006.01)

(52) U.S. Cl.
CPC .......... *G06F 17/289* (2013.01); *G06F 17/2872* (2013.01)
USPC .................................................. 704/2; 704/4

(58) Field of Classification Search
CPC ........................... G06F 17/289; G06F 17/2872
USPC ............................................................ 704/4
See application file for complete search history.

(56) References Cited

U.S. PATENT DOCUMENTS

| | | | |
|---|---|---|---|
| 2006/0200339 A1* | 9/2006 | Satake et al. | 704/4 |
| 2011/0307241 A1* | 12/2011 | Waibel et al. | 704/2 |
| 2012/0034939 A1* | 2/2012 | Al-Omari et al. | 455/466 |

\* cited by examiner

*Primary Examiner* — Farzad Kazeminezhad

(74) *Attorney, Agent, or Firm* — ALG Intellectual Property, LLC

(57) ABSTRACT

A computer-implemented method for data loss prevention may include 1) identifying a network configured with a data loss prevention system including at least one data loss prevention policy directed to textual data expressed in a primary natural language, 2) identifying a textual object subject to a data loss prevention assessment within the network, 3) determining that the textual object includes a textual component that is not expressed in the primary natural language, 4) in response to determining that the textual object includes the textual component, translating the textual component from a secondary natural language that the data loss prevention policy does not recognize into the primary natural language that the data loss prevention policy does recognize, and 5) after translating the textual component into the primary natural language, applying the data loss prevention policy to a modified textual object including the translated textual component. Various other methods, systems, and computer-readable media are also disclosed.

20 Claims, 6 Drawing Sheets

SYSTEMS AND METHODS FOR DATA LOSS PREVENTION IN BILINGUAL TEXT MESSAGES WITH A DATA LOSS POLICY WHICH RECOGNIZES ONLY ONE PRIMARY LANGUAGE

BACKGROUND

In the electronic information age, individuals and organizations may quickly and easily share, access, and disseminate high volumes of information. For many individuals and organizations, the ease with which information may be disseminated electronically is empowering. However, the ubiquity of high-speed Internet access and smart mobile devices may pose unique challenges for individuals and organizations concerned with preventing the loss and/or exposure of sensitive data. Individuals and organizations are therefore increasingly looking for solutions to control the distribution of sensitive data.

Traditional data loss prevention ("DLP") systems may monitor activity and intercept data at a variety of points in a network and/or computing system in efforts to detect and regulate the flow and access of sensitive data. In some cases, a DLP policy may trigger when a DLP system identifies one or more keywords, phrases, and/or textual patterns in intercepted data. Unfortunately, a DLP system may fail to identify sensitive textual data when the textual data is not expressed in the primary language of the DLP system. For examples, some employees of an organization may be multilingual and use languages other than the primary language of the organization in some communications. Accordingly, the instant disclosure identifies and addresses a need for additional and improved systems and methods for data loss prevention.

SUMMARY

As will be described in greater detail below, the instant disclosure generally relates to systems and methods for data loss prevention by identifying uses of secondary languages within a protected system and translating textual data to a primary language (e.g., for which one or more data loss prevention policies are configured) before applying data loss prevention policies within the protected system to the textual data. In one example, a computer-implemented method for data loss prevention may include 1) identifying a network configured with a data loss prevention system including at least one data loss prevention policy directed to textual data expressed in a primary natural language, 2) identifying a textual object subject to a data loss prevention assessment within the network, 3) determining that the textual object includes a textual component that is not expressed in the primary natural language, 4) in response to determining that the textual object includes the textual component, translating the textual component from a secondary natural language into the primary natural language, and 5) after translating the textual component into the primary natural language, applying the data loss prevention policy to a modified textual object including the translated textual component.

In some examples, the primary natural language may use an alphabet that is not used in the secondary natural language. In these examples, translating the textual component from the secondary natural language into the primary natural language may include determining that the textual component includes a transliteration of a term within the secondary natural language using the alphabet of the primary natural language.

In some embodiments, determining that the textual object includes a textual component that is not expressed in the primary natural language may include 1) identifying a database of natural languages that are used by at least one user within the network, 2) identifying the secondary natural language within the database of natural languages, and 3) based on identifying the secondary natural language within the database of natural languages, parsing the textual object for the textual component. Additionally or alternatively, determining that the textual object includes a textual component that is not expressed in the primary natural language may include 1) scanning the textual object for correctness within the primary natural language, 2) based on scanning the textual object, identifying at least one language error within the textual object, and 3) determining that the language error within the textual object is due at least in part to a use of the secondary natural language within the textual component.

In one example, translating the textual component may include 1) identifying a dictionary for mapping the secondary natural language to the primary natural language and 2) using the dictionary to map at least one morpheme within the textual component to at least one morpheme within the primary natural language. Additionally or alternatively, translating the textual component may include 1) identifying a plurality of potential translations for the textual component and 2) selecting a representative translation from the plurality of potential translations based on an absence of language errors within the representative translation.

In some examples, applying the data loss prevention policy may include identifying the data loss prevention policy based in part on determining that the textual object includes a textual component that is not expressed in the primary natural language. Additionally or alternatively, applying the data loss prevention policy may include restricting at least one data movement based at least in part on the data movement including textual data expressed using the secondary natural language. In some examples, the computer-implemented method may also include identifying an alternate translation of the textual component and applying the data loss prevention policy to an alternate modification of the textual object including the alternate translation.

In one embodiment, a system for implementing the above-described method may include 1) an identification module programmed to identify a network configured with a data loss prevention system including at least one data loss prevention policy directed to textual data expressed in a primary natural language, 2) an interception module programmed to identify a textual object subject to a data loss prevention assessment within the network, 3) a determination module programmed to determine that the textual object includes a textual component that is not expressed in the primary natural language, 4) a translation module programmed to, in response to determining that the textual object includes the textual component, translate the textual component from a secondary natural language into the primary natural language, and 5) an application module programmed to, after translating the textual component into the primary natural language, apply the data loss prevention policy to a modified textual object including the translated textual component. The system may also include at least one processor configured to execute the identification module, the interception module, the determination module, the translation module, and the application module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a network configured with a data loss prevention system including at least one data loss prevention policy directed to textual data expressed in a primary natural language, 2) identify a textual object subject to a data loss prevention assessment within the network, 3) determine that the textual object includes a textual component that is not expressed in the primary natural language, 4) in response to determining that the textual object includes the textual component, translate the textual component from a secondary natural language into the primary natural language, and 5) after translating the textual component into the primary natural language, apply the data loss prevention policy to a modified textual object including the translated textual component.

As will be explained in greater detail below, by identifying uses of secondary languages within a protected system and translating textual data to a primary language (e.g., for which one or more data loss prevention policies are configured) before applying data loss prevention policies within the protected system to the textual data, the systems and methods described herein may expand the reach and accuracy of dataloss-prevention determinations. Furthermore, in some examples these systems and methods may take usage patterns of secondary languages into account for future data-lossprevention actions in order to avoid potential circumventions and increase the future accuracy of data-loss-prevention determinations.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
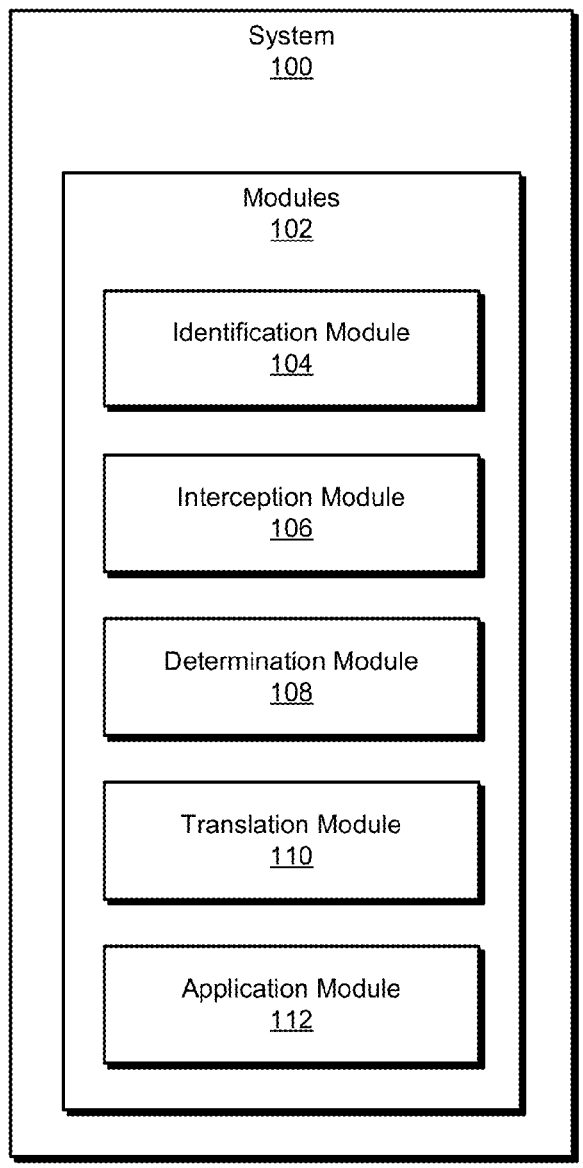
FIG. 1 is a block diagram of an exemplary system for data loss prevention.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
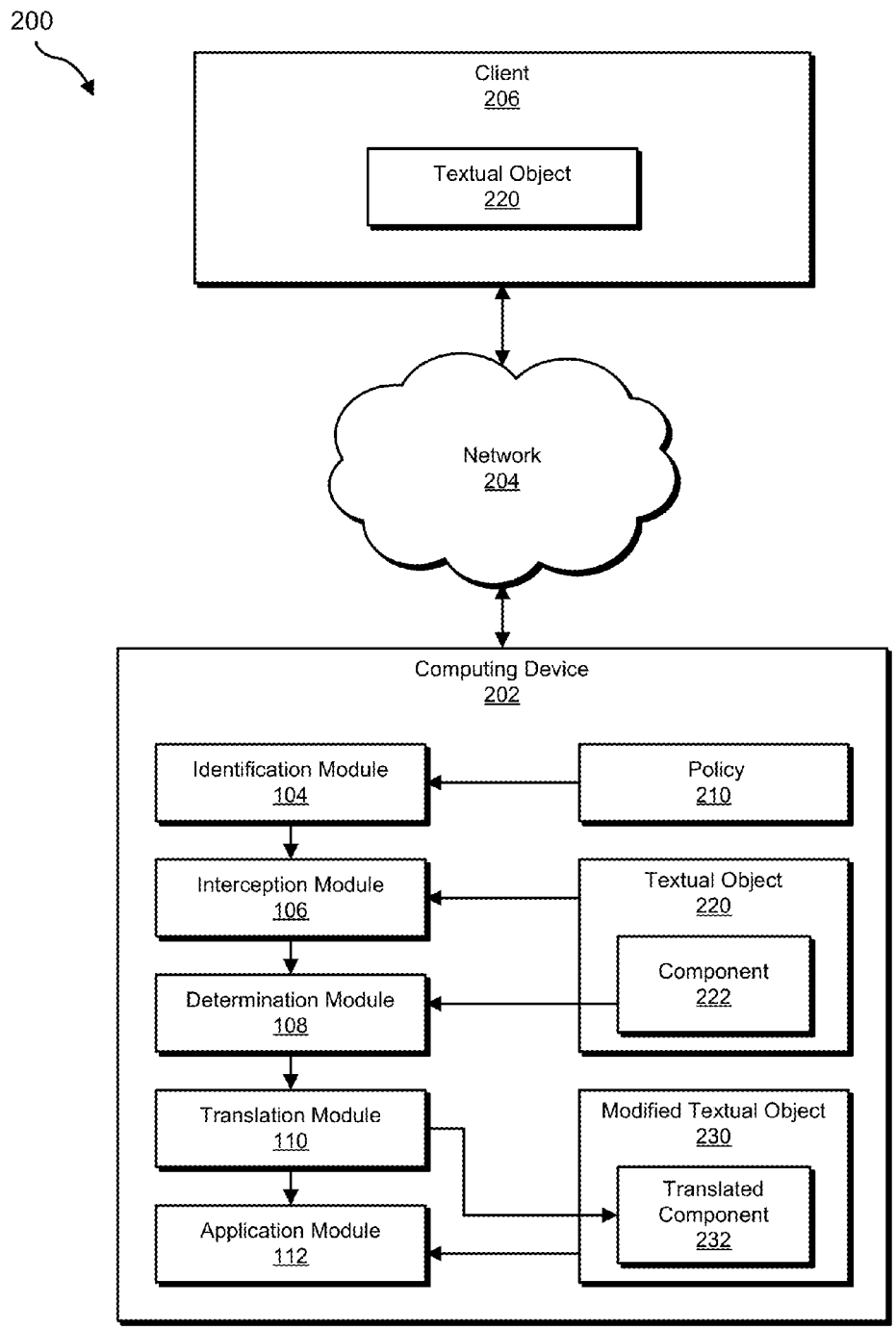
FIG. 2 is a block diagram of an exemplary system for data loss prevention.
Figure 3:
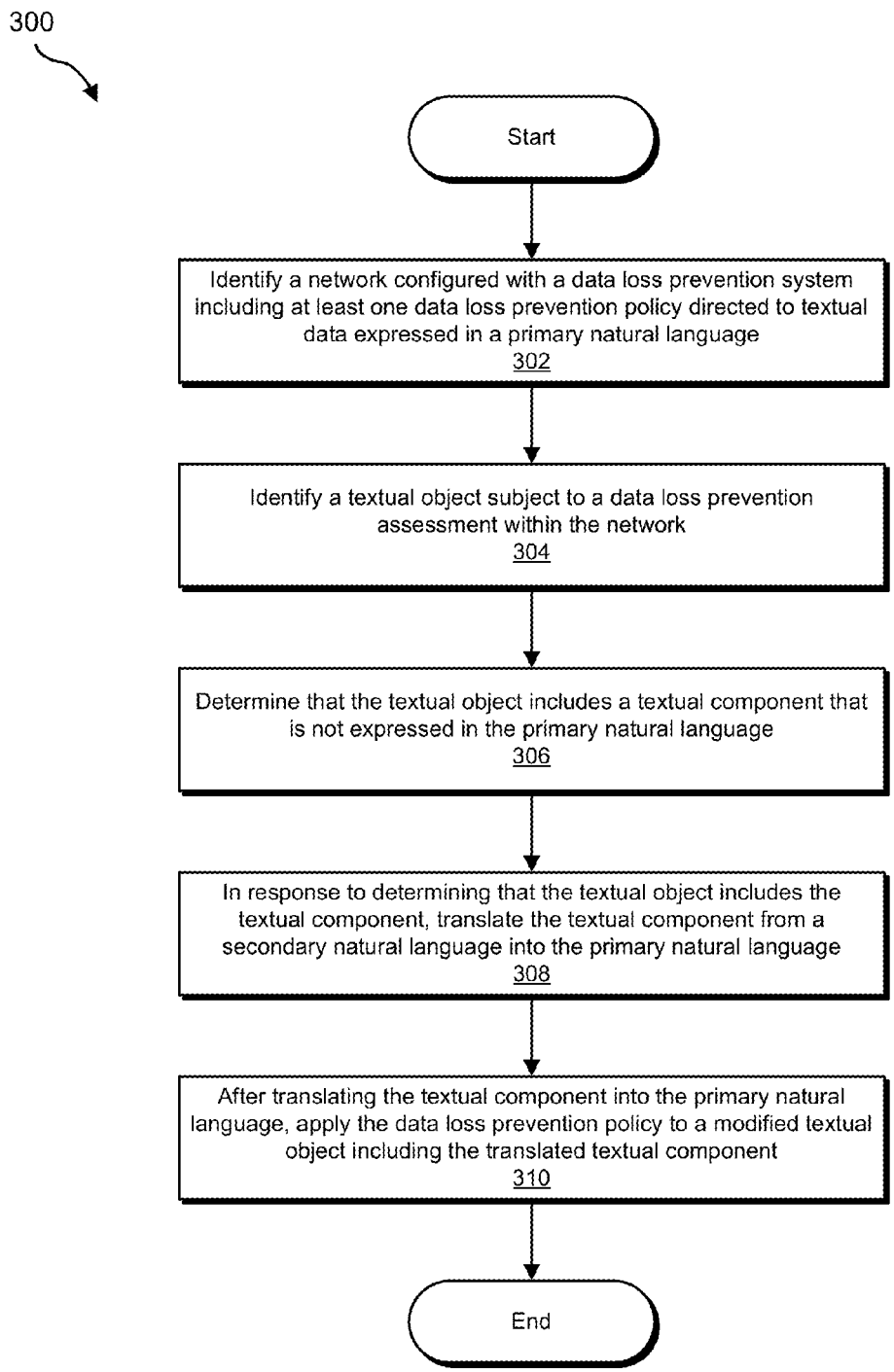
FIG. 3 is a flow diagram of an exemplary method for data loss prevention.
Figure 4:
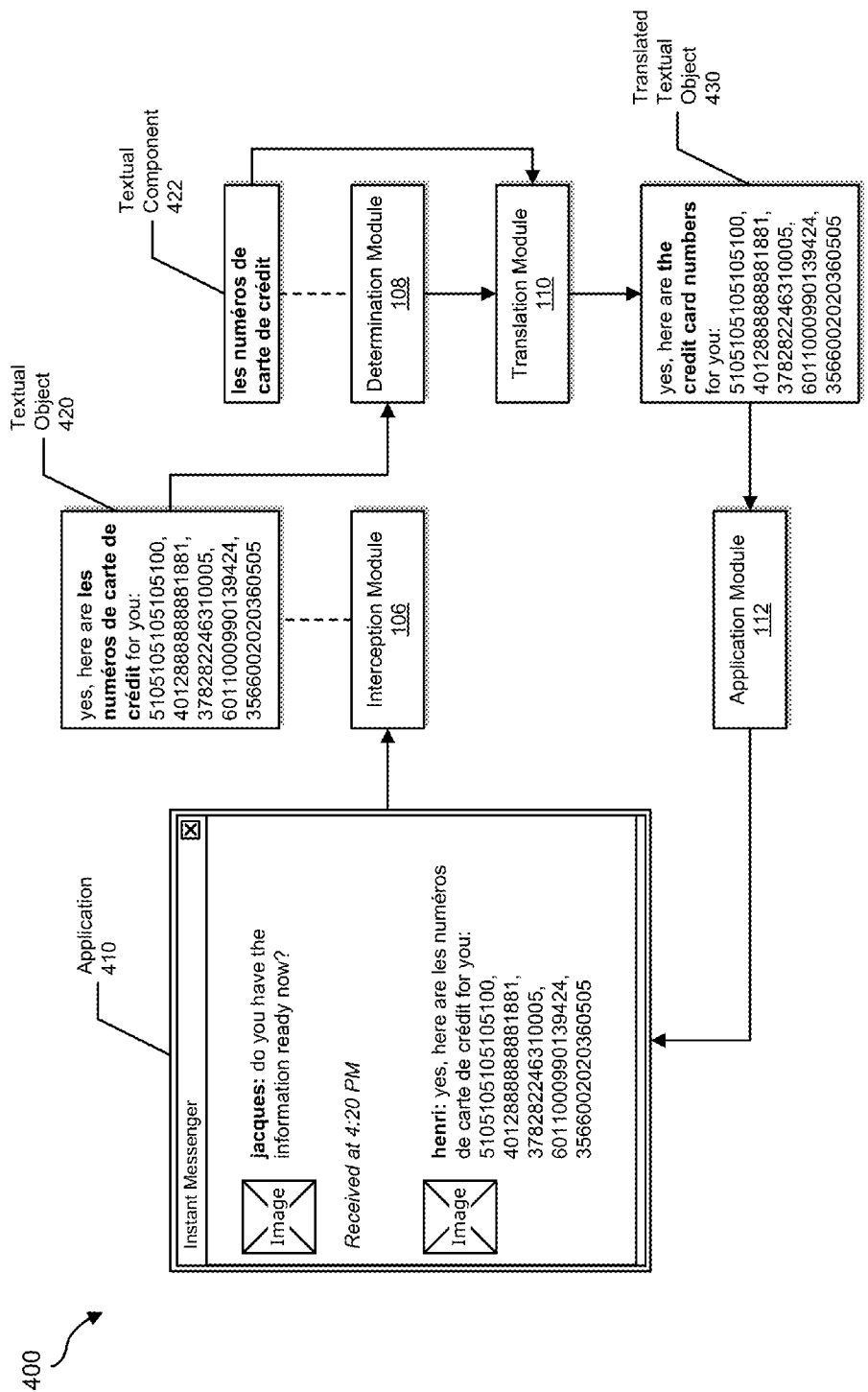
FIG. 4 is a block diagram of an exemplary system for data loss prevention.

The following will provide, with reference to FIGS. 1, 2, and 4, detailed descriptions of exemplary systems for data loss prevention. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for data loss prevention. As illustrated in this figure, exemplary system 100 may include one or more modules 102 for performing one or more tasks. For example, and as will be explained in greater detail below, exemplary system 100 may include an identification module 104 programmed to identify a network configured with a data loss prevention system including at least one data loss prevention policy directed to textual data expressed in a primary natural language. Exemplary system 100 may also include an interception module 106 programmed to identify a textual object subject to a data loss prevention assessment within the network. Exemplary system 100 may additionally include a determination module 108 programmed to determine that the textual object includes a textual component that is not expressed in the primary natural language.

In addition, and as will be described in greater detail below, exemplary system 100 may include a translation module 110 programmed to, in response to determining that the textual object includes the textual component, translate the textual component from a secondary natural language into the primary natural language. Exemplary system 100 may also include an application module 112 programmed to, after translating the textual component into the primary natural language, apply the data loss prevention policy to a modified textual object including the translated textual component. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or client 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a client 206 via a network 204 (e.g., in order to enforce a policy 210 on client 206 and/or network 204).

In one embodiment, one or more of modules 102 from FIG. 1 may, when executed by at least one processor of computing device 202, facilitate computing device 202 in data loss prevention. For example, and as will be described in greater detail below, one or more of modules 102 may cause computing device 202 to 1) identify network 204 configured with a data loss prevention system including policy 210 directed to textual data expressed in a primary natural language, 2) identify a textual object 220 subject to a data loss prevention assessment (e.g., with respect to policy 210) within network 204, 3) determine that textual object 220 includes a component 222 that is not expressed in the primary natural language, 4) in response to determining that textual object 220 includes component 222, translate component 222 from a secondary natural language into the primary natural language (e.g., resulting in a translated component 232), and 5) after translating component 222 into the primary natural language, apply policy 210 to a modified textual object 230 including the translated component 232.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Client 206 generally represents any type or form of computing device that is capable of generating, hosting, processing, receiving, and/or transmitting textual data. Examples of client 206 include, without limitation, laptops, desktops, servers, cellular phones, personal digital assistants (PDAs), multimedia players, embedded systems, combinations of one or more of the same, exemplary computing system 510 in FIG. 5, or any other suitable computing device. In some examples, data within client 206 may be subject to one or more data loss prevention policies.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and client 206. In some examples, network 204 may be subject to one or more data loss prevention policies.

FIG. 3 is a flow diagram of an exemplary computer-implemented method 300 for data loss prevention. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a network configured with a data loss prevention system including at least one data loss prevention policy directed to textual data expressed in a primary natural language. For example, at step 302 identification module 104 may, as part of computing device 202 in FIG. 2, identify network 204 configured with a data loss prevention system including policy 210 directed to textual data expressed in a primary natural language.

As used herein, the phrase "data loss prevention system" may refer to a system for protecting sensitive information by applying one or more policies, rules, and/or heuristics to data within the bounds of the system to determine the disposition of the data in various scenarios. In some examples, a "data loss prevention system" may be configured to prevent sensitive information from leaking (e.g., being transmitted outside the bounds of the system under uncontrolled circumstances), being accessed by unauthorized parties, and/or being used and/or stored in unsecure contexts. As used herein, the phrase "data loss prevention policy" may refer to a policy and/or rule that describes, defines, or otherwise identifies content that an organization desires to protect. For example, a data loss prevention policy may identify keywords, phrases, and/or regular expressions that indicate the presence of sensitive data in an object and/or document.

As used herein, the phrase "textual data" may refer to any data with computer-identifiable textual characters, words, and/or phrases. As used herein, the phrase "natural language" may refer to any language usable for human communication (e.g., English, Hindi, Mandarin, French, Esperanto, etc.). Accordingly, the phrase "primary natural language" may refer to a natural language that is an official, primary, and/or principal language used within an organization that owns, manages, and/or uses the network. In some examples, the phrase "primary natural language" may refer to a natural language for which one or more data loss prevention policies and/or rules within the data loss prevention system are designed (e.g., a natural language used to express words and/or phrases identified by the data loss prevention system). In some examples, and as will be explained in greater detail below, the primary natural language may use an alphabet that is not used in a secondary natural language that may be found in textual data on the network Identification module 104 may identify the network in any suitable manner. For example, identification module 104 may identify the network by operating as a part of a data loss prevention system configured to protect the network and/or one or more computing systems connected to the network. In some examples, identification module 104 may also identify one or more data loss prevention policies applicable to data within the network.

Returning to FIG. 3, at step 304 one or more of the systems described herein may identify a textual object subject to a data loss prevention assessment within the network. For example, at step 304 interception module 106 may, as part of computing device 202 in FIG. 2, identify a textual object 220 subject to a data loss prevention assessment (e.g., with respect to policy 210) within network 204.

As used herein, the phrase "textual object" may refer to any document containing and/or representing textual data and/or any other suitable unit of text that may be identified, extracted, and/or examined by a data loss prevention system. As used herein, the phrase "data loss prevention assessment" may refer to any scan, analysis, and/or inspection of data and/or metadata that may be employed to ensure compliance with one or more data loss prevention policies and/or rules.

Interception module 106 may identify the textual object in any of a variety of contexts. For example, interception module 106 may identify the textual object as a part of a data loss prevention agent installed on a client system on the network. In this example, interception module 106 may observe the creation, modification, copying, and/or propagation of a text-based document, message, and/or file via one or more commands, operations, and/or applications (e.g., performed by a user of the client system). Additionally or alternatively, interception module 106 may identify the textual object as a part of a data loss prevention agent, appliance, and/or filter situated at an egress point of the network.

FIG. 4 illustrates an exemplary system 400 for data loss prevention. As shown in FIG. 4, exemplary system 400 may include an application 410 (e.g., an instant messenger application) into which a user ("henri") has entered text for transmission outside the network (e.g., to "jacques"). In this example, interception module 106 may intercept the attempt by the user to transmit the text (e.g., a textual object 420).

Returning to FIG. 3, at step 306 one or more of the systems described herein may determine that the textual object includes a textual component that is not expressed in the primary natural language. For example, at step 306 determination module 108 may, as part of computing device 202 in FIG. 2, determine that textual object 220 includes a component 222 that is not expressed in the primary natural language.

As used herein, the phrase "textual component" may refer to word, phrase, morpheme, and/or textual structure within a textual object. In some examples, the textual component may include multiple words and/or phrases, either in sequence or distributed through a textual object.

Determination module 108 may determine that the textual object includes a textual component not expressed in the primary natural language in any of a variety of ways. For example, determination module 108 may identify a database of natural languages that are used by at least one user within the network. For example, the primary natural language used within the network may be English, but some users within the network may also speak French or Arabic. Accordingly, the database may identify French and Arabic as possible alternate languages. Determination module 108 may then identify a secondary natural language within the database of natural languages, and, based on identifying the secondary natural language within the database of natural languages, parsing the textual object for the textual component (e.g., for one or more textual components expressed within the secondary natural language).

In some examples, determination module 108 may determine that the textual object includes a textual component that is not expressed in the primary natural language by scanning the textual object for correctness within the primary natural language. For example, determination module 108 may scan the textual object for apparent orthographic errors and/or grammatical errors. Determination module 108 may then, based on scanning the textual object, identify at least one language error within the textual object (e.g., the language error being relative to the primary natural language). For example, determination module 108 may identify an apparent spelling error (e.g., due to a word or phrase not expressed in the primary natural language). Determination module 108 may then determine that the language error within the textual object is due at least in part to a use of the secondary natural language within the textual component. For example, determination module 108 may compare an apparently erroneous word or phrase with a dictionary of the secondary natural language to determine that the word or phrase is expressed in the secondary natural language. In some examples, determination module 108 may limit the scope of what is considered the cross-linguistic textual component within the textual object by identifying portions of the textual object that appear consistent with the primary natural language.

Using FIG. 4 as an example, at step 306 determination module 108 may determine that a textual component 422 of textual object 420 does not represent a correct English phrase. Accordingly, determination module 108 may determine that "les numerous de carte de credit" corresponds to a different natural language and provide textual component 422 to translation module 110.

Returning to FIG. 3, at step 308 one or more of the systems described herein may in response to determining that the textual object includes the textual component, translate the textual component from a secondary natural language into the primary natural language. For example, at step 308 translation module 110 may, as part of computing device 202 in FIG. 2, in response to determining that textual object 220 includes component 222, translate component 222 from a secondary natural language into the primary natural language (e.g., resulting in a translated component 232).

Translation module 110 may translate the textual component in any of a variety of ways. As mentioned earlier, in some examples, the primary natural language may use an alphabet that is not used by the secondary natural language. Accordingly, the textual component may include a transliteration of a term within the secondary natural language using the alphabet. In these examples, translation module 110 may determine that the textual component includes a transliteration using the alphabet of the primary natural language. Translation module 110 may, accordingly, translate the transliterated term within the textual component.

In some examples, translation module 110 may identify a dictionary for mapping the secondary natural language to the primary natural language. In these examples, translation module 110 may use the dictionary to map at least one morpheme within the textual component to at least one morpheme (e.g., a word or a phrase) within the primary natural language.

As used herein, the term "dictionary" may refer to any of a variety of resources and/or services. For example, the term "dictionary" may refer to a database, a data structure, a translation application, and/or a translation service. In some examples, the dictionary may provide direct term-to-term and/or phrase-to-phrase translations. Additionally or alternatively, the dictionary may provide multiple possible terms and/or phrases in the target (primary) language that may correspond to a term and/or phrase in the source (secondary) language. Accordingly, in some examples, translation module 110 may identify a plurality of potential translations for the textual component. In these examples, translation module 110 may select a translation based on any of a variety of criteria. For example, translation module 110 may select a representative translation from the plurality of potential translations based on an absence of language errors within the representative translation. For example, translation module 110 may select a representative translation to maximize a correctness score of the resulting text within the primary natural language. Additionally or alternatively, translation module 110 may select a representative translation based on a translation that is most likely to represent sensitive data.

Using FIG. 4 as an example, at step 308 translation module 110 may translate textual component 422 to "the credit card numbers." Accordingly, translation module 110 may generate a translated textual object 430 based on textual object 420 and the translation of textual component 422.

Returning to FIG. 3, at step 310 one or more of the systems described herein may, after translating the textual component into the primary natural language, apply the data loss prevention policy to a modified textual object including the translated textual component. For example, at step 310 application module 112 may, as part of computing device 202 in FIG. 2, after translating component 222 into the primary natural language, apply policy 210 to a modified textual object 230 including the translated component 232.

In some examples, application module 112 may select the data loss prevention policy to apply to the modified textual object. For example, application module 112 may identify the data loss prevention policy based in part on determining that the textual object includes a textual component that is not expressed in the primary natural language. Additionally or alternatively, application module 112 may identify the data loss prevention policy based particularly on the textual component being expressed in the secondary natural language. For example, the data loss prevention policy may represent an additional policy applied to textual objects with textual components outside the primary natural language. Additionally or alternatively, the data loss prevention policy may represent a more strict version of a data loss prevention policy that would have otherwise been applied to the textual object had the textual object not included a textual component in the secondary natural language.

The data loss prevention policy may include any of a variety of remediations. For example, application module 112 may restrict at least one data movement based at least in part on the data movement including textual data expressed using the secondary natural language. Additionally or alternatively, application module 112 may, in applying the data loss prevention policy, log both the textual object and the modified textual object. In some examples, application module 112 may record an instance of attempted communication in the secondary natural language. In some examples, application module 112 may track a history of violations with the secondary natural language (and, e.g., any other natural languages used on the network). Application module 112 may then report the history to an administrator and/or use the history to adjust data loss prevention policies within the network based on languages used (e.g., placing stricter restrictions on languages with higher rates of violations).

As mentioned earlier, in some examples the textual component may have more than one translation into the primary natural language. In these examples, application module 112 may identify an alternate translation of the textual component. Application module 112 may then apply the data loss prevention policy to an alternate modification of the textual object including the alternate translation (e.g., in addition to applying the data loss prevention policy to the original modification of the textual object based on the original translation of the textual component). In this manner, application module 112 may ensure that the textual object does not pass the data loss prevention policy due to mistranslation.

Using FIG. 4 as an example, at step 310 application module 112 may apply the data loss prevention policy to application 410 based on translated textual object 430 (e.g., instead of or in addition to textual object 420). After step 310, method 300 may terminate.

As explained above, by identifying uses of secondary languages within a protected system and translating textual data to a primary language (e.g., for which one or more data loss prevention policies are configured) before applying data loss prevention policies within the protected system to the textual data, the systems and methods described herein may expand the reach and accuracy of data-loss-prevention determinations. Furthermore, in some examples these systems and methods may take usage patterns of secondary languages into account for future data-loss-prevention actions in order to avoid potential circumventions and increase the future accuracy of data-loss-prevention determinations.

Figure 5:
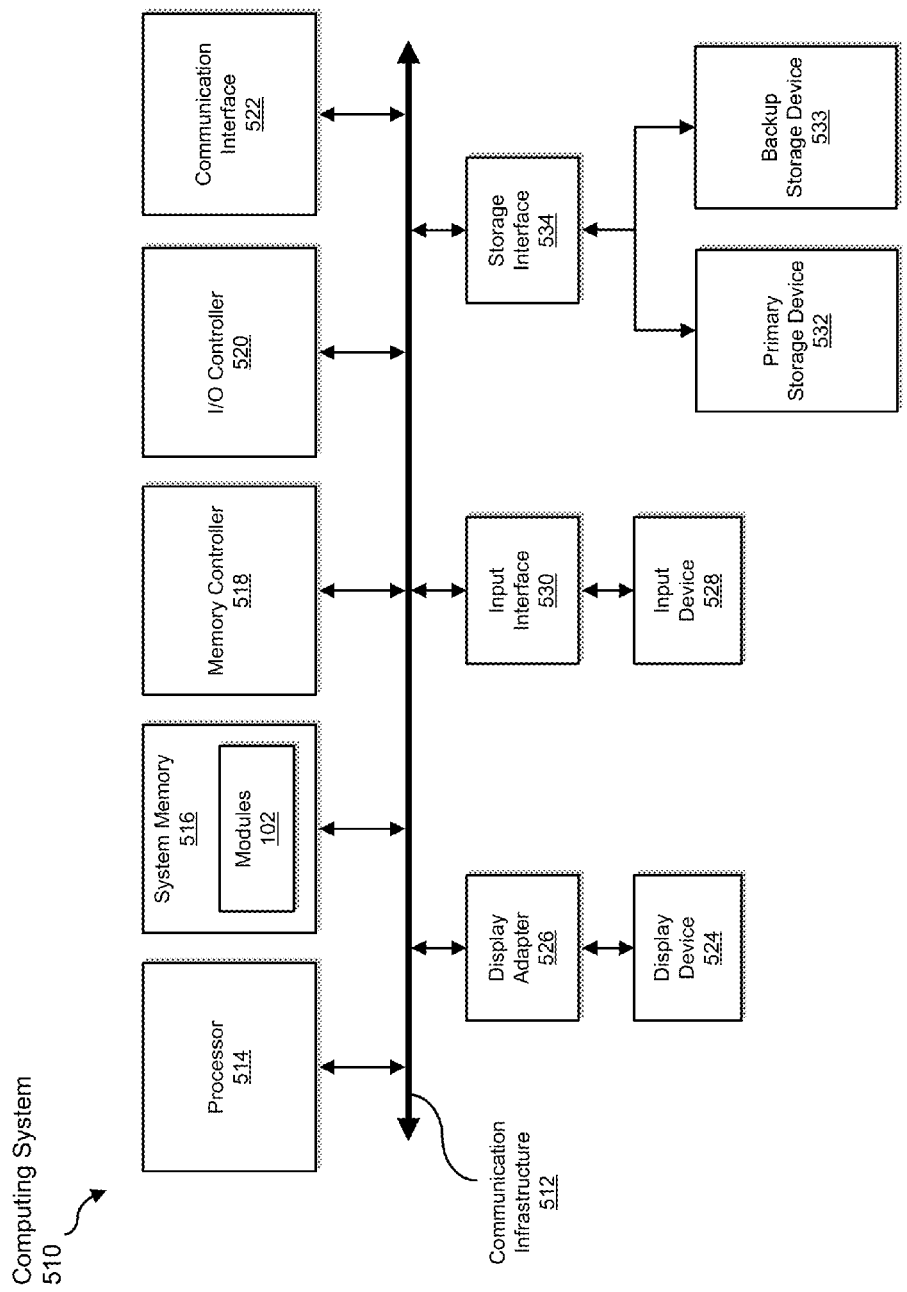
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, determining, scanning, translating, using, mapping, selecting, applying, and restricting steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network (PAN), a telephone or cable network, a cellular telephone connection (e.g., a GSM Network), a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
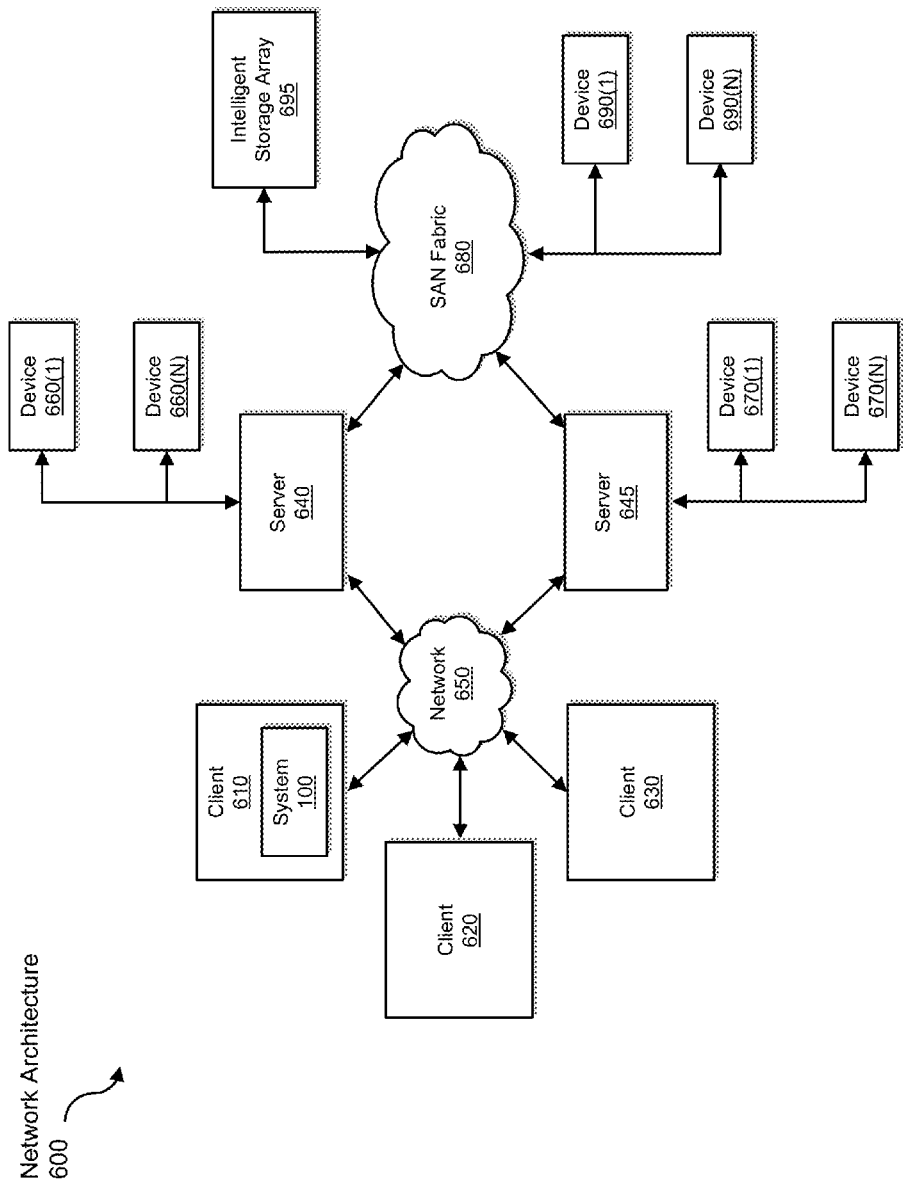
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, determining, scanning, translating, using, mapping, selecting, applying, and restricting steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for data loss prevention.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for data loss prevention. As another example, one or more of the modules recited herein may transform a textual object into a single-language textual object prepared for a data loss prevention assessment.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for data loss prevention, at least a portion of the method being performed by a computing device comprising at least one processor, the method comprising:

identifying a network configured with a data loss prevention system comprising at least one data loss prevention policy directed to textual data expressed in a primary natural language;

identifying a textual object subject to a data loss prevention assessment within the network;

determining that the textual object comprises a textual component that is not expressed in the primary natural language;
in response to determining that the textual object comprises the textual component, translating the textual component from a secondary natural language that the data loss prevention policy does not recognize into the primary natural language that the data loss prevention policy does recognize;
after translating the textual component into the primary natural language, applying the data loss prevention policy to a modified textual object comprising the translated textual component.

2. The computer-implemented method of claim 1, wherein determining that the textual object comprises the textual component that is not expressed in the primary natural language comprises:
identifying a database of natural languages that are used by at least one user within the network;
identifying the secondary natural language within the database of natural languages;
based on identifying the secondary natural language within the database of natural languages, parsing the textual object for the textual component.

3. The computer-implemented method of claim 1, wherein determining that the textual object comprises the textual component that is not expressed in the primary natural language comprises:
scanning the textual object for correctness within the primary natural language;
based on scanning the textual object, identifying at least one language error within the textual object;
determining that the language error within the textual object is due at least in part to a use of the secondary natural language within the textual component.

4. The computer-implemented method of claim 1, wherein:
the primary natural language uses an alphabet that is not used in the secondary natural language;
translating the textual component comprises determining that the textual component comprises a transliteration of a term within the secondary natural language using the alphabet.

5. The computer-implemented method of claim 1, wherein translating the textual component comprises:
identifying a dictionary for mapping the secondary natural language to the primary natural language;
using the dictionary to map at least one morpheme within the textual component to at least one morpheme within the primary natural language.

6. The computer-implemented method of claim 1, wherein translating the textual component comprises:
identifying a plurality of potential translations for the textual component;
selecting a representative translation from the plurality of potential translations based on an absence of language errors within the representative translation.

7. The computer-implemented method of claim 1, further comprising:
identifying an alternate translation of the textual component;
applying the data loss prevention policy to an alternate modification of the textual object comprising the alternate translation.

8. The computer-implemented method of claim 1, wherein applying the data loss prevention policy comprises identifying the data loss prevention policy based in part on determining that the textual object comprises a textual component that is not expressed in the primary natural language.

9. The computer-implemented method of claim 1, wherein applying the data loss prevention policy comprises restricting at least one data movement based at least in part on the data movement comprising textual data expressed using the secondary natural language.

10. A system for data loss prevention, the system comprising:
an identification module programmed to identify a network configured with a data loss prevention system comprising at least one data loss prevention policy directed to textual data expressed in a primary natural language;
an interception module programmed to identify a textual object subject to a data loss prevention assessment within the network;
a determination module programmed to determine that the textual object comprises a textual component that is not expressed in the primary natural language;
a translation module programmed to, in response to determining that the textual object comprises the textual component, translate the textual component from a secondary natural language that the data loss prevention policy does not recognize into the primary natural language that the data loss prevention policy does recognize;
an application module programmed to, after translating the textual component into the primary natural language, apply the data loss prevention policy to a modified textual object comprising the translated textual component;
at least one processor configured to execute the identification module, the interception module, the determination module, the translation module, and the application module.

11. The system of claim 10, wherein the determination module is programmed to determine that the textual object comprises the textual component that is not expressed in the primary natural language by:
identifying a database of natural languages that are used by at least one user within the network;
identifying the secondary natural language within the database of natural languages;
based on identifying the secondary natural language within the database of natural languages, parsing the textual object for the textual component.

12. The system of claim 10, wherein the determination module is programmed to determine that the textual object comprises the textual component that is not expressed in the primary natural language by:
scanning the textual object for correctness within the primary natural language;
based on scanning the textual object, identifying at least one language error within the textual object;
determining that the language error within the textual object is due at least in part to a use of the secondary natural language within the textual component.

13. The system of claim 10, wherein:
the primary natural language uses an alphabet that is not used in the secondary natural language;
the translation module is programmed to translate the textual component by determining that the textual component comprises a transliteration of a term within the secondary natural language using the alphabet.

14. The system of claim 10, wherein the translation module is programmed to translate the textual component by:
identifying a dictionary for mapping the secondary natural language to the primary natural language;

using the dictionary to map at least one morpheme within the textual component to at least one morpheme within the primary natural language.

15. The system of claim 10, wherein the translation module is programmed to translate the textual component by:

identifying a plurality of potential translations for the textual component;

selecting a representative translation from the plurality of potential translations based on an absence of language errors within the representative translation.

16. The system of claim 10, wherein the application module is further programmed to:

identify an alternate translation of the textual component;

apply the data loss prevention policy to an alternate modification of the textual object comprising the alternate translation.

17. The system of claim 10, wherein the application module is programmed to apply the data loss prevention policy by identifying the data loss prevention policy based in part on determining that the textual object comprises a textual component that is not expressed in the primary natural language.

18. The system of claim 10, wherein the application module is programmed to apply the data loss prevention policy by restricting at least one data movement based at least in part on the data movement comprising textual data expressed using the secondary natural language.

19. A non-transitory computer-readable-storage medium comprising one or more computer-executable instructions that, when executed by at least one processor of a computing device, cause the computing device to:

identify a network configured with a data loss prevention system comprising at least one data loss prevention policy directed to textual data expressed in a primary natural language;

identify a textual object subject to a data loss prevention assessment within the network;

determine that the textual object comprises a textual component that is not expressed in the primary natural language;

in response to determining that the textual object comprises the textual component, translate the textual component from a secondary natural language that the data loss prevention policy does not recognize into the primary natural language that the data loss prevention policy does recognize;

after translating the textual component into the primary natural language, apply the data loss prevention policy to a modified textual object comprising the translated textual component.

20. The computer-readable-storage medium of claim 19, wherein the one or more computer-executable instructions cause the computing device to determine that the textual object comprises the textual component that is not expressed in the primary natural language by causing the computing device to:

identify a database of natural languages that are used by at least one user within the network;

identify the secondary natural language within the database of natural languages;

based on identifying the secondary natural language within the database of natural languages, parse the textual object for the textual component.

* * * * *